US011964788B2

(12) United States Patent
Small et al.

(10) Patent No.: US 11,964,788 B2
(45) Date of Patent: Apr. 23, 2024

(54) SYSTEMS AND METHODS FOR AUTOMATED PRESCRIPTION PREPARATION

(71) Applicant: McKesson Corporation, Irving, TX (US)

(72) Inventors: Cody F. Small, Loveland, CO (US); Brendan Hunt, Superior, CO (US); Kevin Austria, Wesminster, CO (US); Matthew Collegeman, Thornton, CO (US); Allen Sager, Thornton, CO (US)

(73) Assignee: McKesson Corporation, Irving, TX (US)

( * ) Notice: Subject to any disclaimer, the term of this patent is extended or adjusted under 35 U.S.C. 154(b) by 0 days.

(21) Appl. No.: 17/899,855

(22) Filed: Aug. 31, 2022

(65) Prior Publication Data

US 2024/0067373 A1 Feb. 29, 2024

(51) Int. Cl.
*B65B 5/10* (2006.01)
*B65B 43/52* (2006.01)

(52) U.S. Cl.
CPC .............. *B65B 5/105* (2013.01); *B65B 43/52* (2013.01)

(58) Field of Classification Search
CPC ......... B65B 5/105; B65B 43/52; B65B 35/36; B65B 35/16; B65B 43/46; B65B 35/24
See application file for complete search history.

(56) References Cited

U.S. PATENT DOCUMENTS

| 5,771,657 A * | 6/1998 | Lasher ................... B65B 61/20 53/493 |
| 7,313,898 B1 * | 1/2008 | Eller ...................... B65B 21/06 53/151 |
| 7,765,776 B1 * | 8/2010 | Leu ........................... B67B 3/00 53/411 |
| 10,086,974 B2 * | 10/2018 | Joplin .................... B65D 19/44 |
| 11,288,505 B2 * | 3/2022 | Klumph ............... G06V 30/333 |
| 2011/0150619 A1 * | 6/2011 | Nilsson ................... B65B 35/38 414/800 |
| 2013/0101377 A1 * | 4/2013 | Hawkes ................. B65B 35/54 414/589 |
| 2016/0107781 A1 * | 4/2016 | Hutter .................... B65B 43/52 53/467 |
| 2017/0015005 A1 * | 1/2017 | Joplin .................... B65B 9/045 |
| 2018/0221244 A1 * | 8/2018 | Joplin .................... B65B 61/20 |
| 2019/0263551 A1 * | 8/2019 | Sasso ................... B65B 25/143 |
| 2020/0122936 A1 * | 4/2020 | Bennett .................. B65B 35/54 |
| 2022/0185510 A1 * | 6/2022 | Hoffman ................ B65B 35/38 |

* cited by examiner

*Primary Examiner* — Anna K Kinsaul
*Assistant Examiner* — Himchan Song
(74) *Attorney, Agent, or Firm* — Ballard Spahr LLP

(57) ABSTRACT

A system includes a gantry having an end-of-arm tool (EOAT). The gantry can include a first linear actuator that is configured to axially move the EOAT along a first axis and second linear actuator that is configured to axially move the EOAT along a second axis that is perpendicular to the first axis. The system can further include at least one input conveyor. Each input conveyor can have a plurality of pucks that are each configured to receive a prescription container and carry the prescription container to the gantry. The system can further include at least one output conveyor that is configured to receive the prescription container from the gantry. The gantry can be configured to move the prescription containers from the plurality of pucks to the output conveyor(s).

17 Claims, 8 Drawing Sheets

SYSTEMS AND METHODS FOR AUTOMATED PRESCRIPTION PREPARATION

FIELD

This application relates to systems and methods for preparing prescriptions and, in exemplary aspects, to systems and methods for moving prescriptions from pucks to other conveying means.

BACKGROUND

Conventionally, in automated prescription preparation, prescriptions are provided in pucks to an arm having multiple rotational axes (e.g., a five-axis or six-axis robotic arm). The pucks are configured to receive individual prescription containers. The robotic arm moves the prescription containers from pucks of an incoming conveyor to a tote of an outgoing conveyor. The conventional robotic arm has a limited range. Thus, the robotic arm is limited to servicing a single incoming conveyor and a single outgoing conveyor. The conventional system is incapable of expansion for more incoming or outgoing conveyors.

SUMMARY

Disclosed herein, in at least one aspect, is a system for transferring prescription containers from pucks. The system includes a gantry having an end-of-arm tool (EOAT). The gantry includes a first linear actuator that is configured to axially move the EOAT along a first axis and second linear actuator that is configured to axially move the EOAT along a second axis that is perpendicular to the first axis. The system further includes at least one input conveyor. Each input conveyor has a plurality of pucks that are each configured to receive at least one prescription container and carry the at least one prescription container to the gantry. The system further includes at least one output conveyor that is configured to receive the at least one prescription container from the gantry. The gantry is configured to move the prescription containers from the plurality of pucks to the output conveyor(s).

In another aspect, at least one method of the present disclosure includes receiving, at a gantry, at least one prescription container from at least one input conveyor. A gantry moves the at least one prescription container from the at least one input conveyor to at least one output conveyor. The gantry has a first linear actuator that is configured to axially move the EOAT along a first axis and second linear actuator that is configured axially move the EOAT along a second axis that is perpendicular to the first axis. Each input conveyor of the at least one input conveyor includes a plurality of pucks that are each configured to receive at least one prescription container. Each puck of the plurality of pucks is configured to carry the at least one prescription container to the gantry.

Additional advantages of the disclosed systems and methods will be set forth in part in the description which follows, and in part will be understood from the description, or may be learned by practice of the disclosed systems and methods. The advantages of the disclosed system and method will be realized and attained by means of the elements and combinations recited in the appended claims. It is to be understood that both the foregoing general description and the following detailed description are exemplary and explanatory only and are not restrictive of the inventions as claimed.

BRIEF DESCRIPTION OF THE DRAWINGS

The accompanying drawings, which are incorporated in and constitute a part of this specification, illustrate several embodiments of the disclosed apparatus, systems, and methods and together with the description, serve to explain the principles of the disclosed apparatus, systems, and methods.

DETAILED DESCRIPTION

Figure 1:
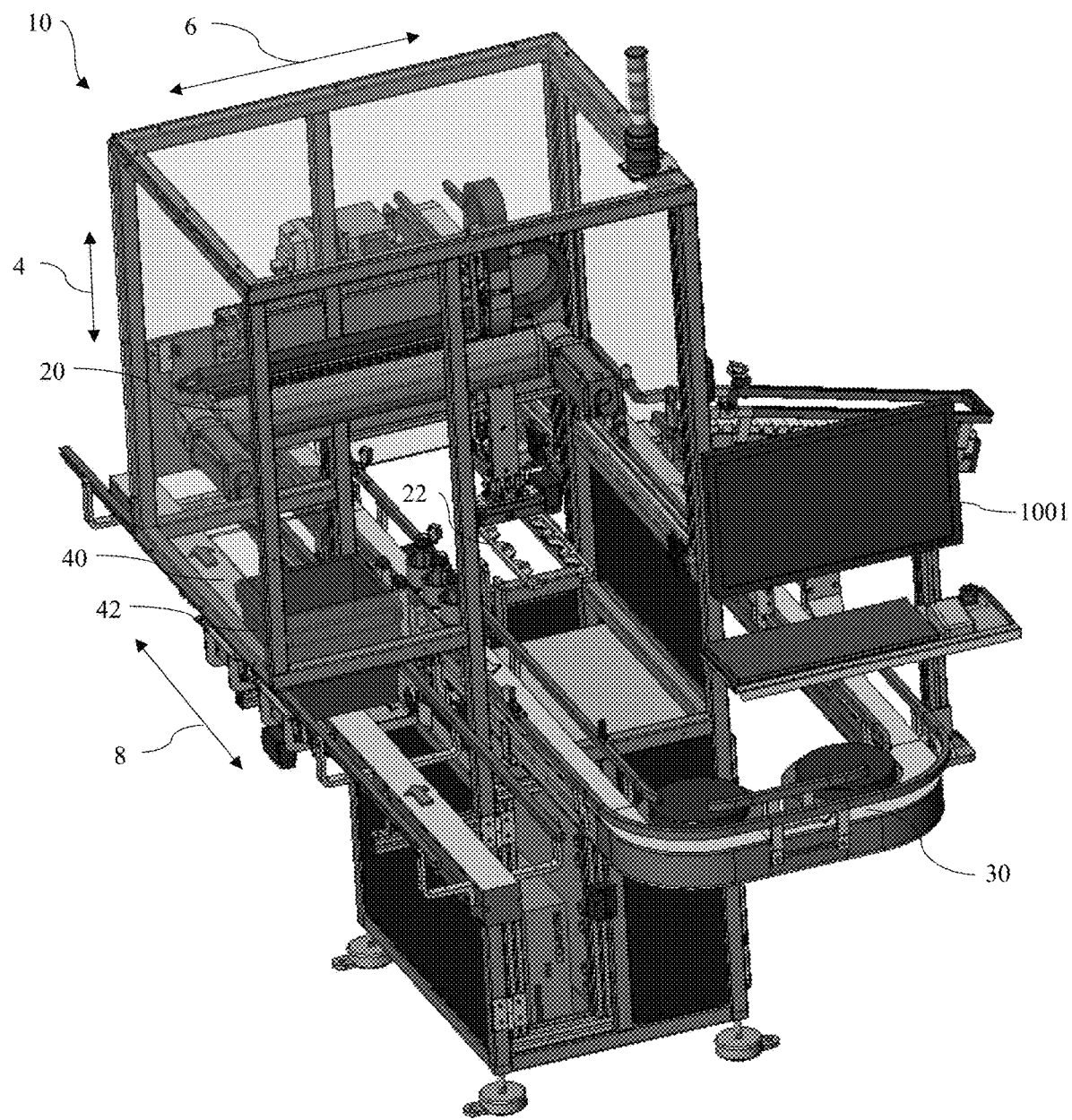
FIG. 1 is a partial perspective view of an exemplary system as disclosed herein.

The disclosed systems and methods may be understood more readily by reference to the following detailed description of particular embodiments and the examples included therein and to the Figures and their previous and following description.

It is to be understood that the terminology used herein is for the purpose of describing particular embodiments only and is not intended to limit the scope of the present inventions described in the appended claims.

It must be noted that as used herein and in the appended claims, the singular forms "a," "an," and "the" include plural references unless the context clearly dictates otherwise. Thus, for example, reference to "a puck" includes one or more of such pucks, and so forth.

"Optional" or "optionally" means that the subsequently described event, circumstance, or material may or may not occur or be present, and that the description includes instances where the event, circumstance, or material occurs or is present and instances where it does not occur or is not present.

Ranges may be expressed herein as from "about" one particular value, and/or to "about" another particular value. When such a range is expressed, also specifically contemplated and considered disclosed is the range from the one particular value and/or to the other particular value unless the context specifically indicates otherwise. Similarly, when values are expressed as approximations, by use of the antecedent "about," it will be understood that the particular value forms another, specifically contemplated embodiment that should be considered disclosed unless the context specifically indicates otherwise. It will be further understood that the endpoints of each of the ranges are significant both in relation to the other endpoint, and independently of the other endpoint unless the context specifically indicates otherwise. Finally, it should be understood that all of the individual values and sub-ranges of values contained within an explicitly disclosed range are also specifically contemplated and should be considered disclosed unless the context specifically indicates otherwise. The foregoing applies regardless of whether in particular cases some or all of these embodiments are explicitly disclosed.

Optionally, in some aspects, when values or characteristics are approximated by use of the antecedents "about," "substantially," or "generally," it is contemplated that values within up to 15%, up to 10%, up to 5%, or up to 1% (above or below) of the particularly-stated value or characteristic can be included within the scope of those aspects.

Unless defined otherwise, all technical and scientific terms used herein have the same meanings as commonly understood by one of skill in the art to which the disclosed apparatus, system, and method belong. Although any apparatus, systems, and methods and materials similar or equivalent to those described herein can be used in the practice or testing of the present apparatus, system, and method, the particularly useful methods, devices, systems, and materials are as described.

Throughout the description and claims of this specification, the word "comprise" and variations of the word, such as "comprising" and "comprises," means "including but not limited to," and is not intended to exclude, for example, other additives, components, integers or steps. In particular, in methods stated as comprising one or more steps or operations it is specifically contemplated that each step comprises what is listed (unless that step includes a limiting term such as "consisting of"), meaning that each step is not intended to exclude, for example, other additives, components, integers or steps that are not listed in the step. Unless the context indicates otherwise, it is contemplated that the terms "comprising" and "comprises" can include, as separate aspects, the terms "consisting of," "consists of," "consisting essentially of," or consists essentially of."

Figure 2:
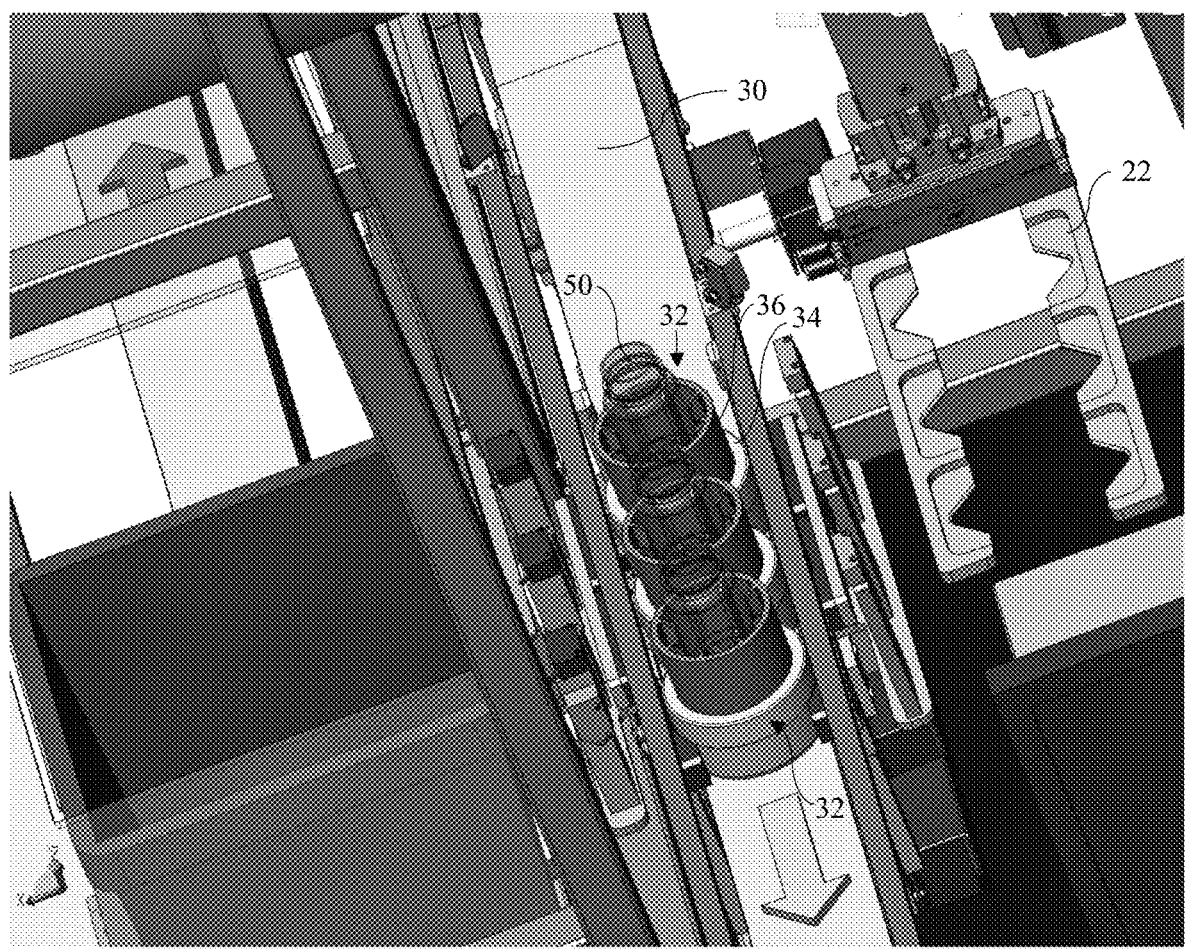
FIG. 2 is a partial perspective view of the system of FIG. 1, showing detail of prescription containers on an input conveyor, an end of arm tool (EOAT), and output conveyor.
Figure 8A:
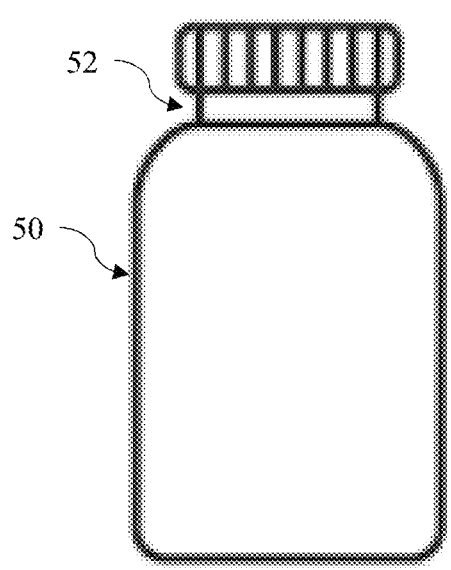
FIG. 8A shows an exemplary pill bottle for use with the system as disclosed herein.
Figure 8B:
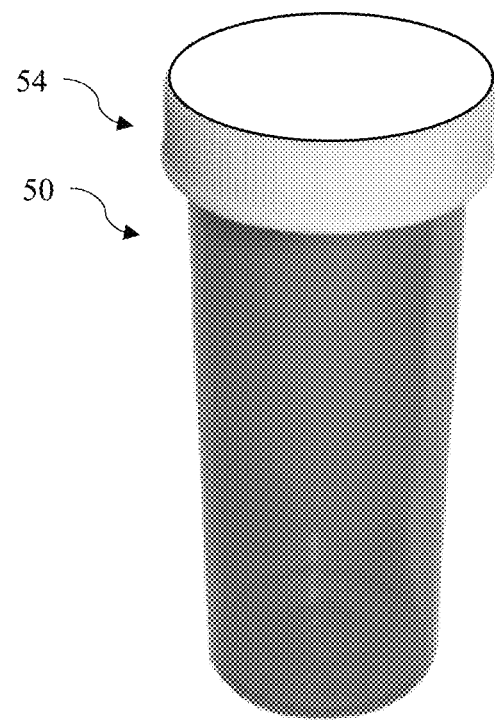
FIG. 8B shows an exemplary pill vial for use with the system as disclosed herein.

Disclosed herein and with reference to FIGS. 1-2, is a system 10 for automated transfer of prescription containers from pucks. Prescription containers can include, for example, pill bottles (FIG. 8A) or pill vials (FIG. 8B). In some exemplary aspects, the prescription containers can have cylindrical outer circumferential surfaces. In other exemplary aspects, the prescription containers can have round cross sections that taper in diameter along the height of the respective prescription containers. In still other exemplary aspects, the prescription containers can, in cross sections in horizontal planes, be rectangular, square, or any other shape. The prescription containers can have upper sections that are configured for engagement with a cover structure, such as a lid. Optionally, the upper sections can have a threaded structure that engages complementary threads of a lid.

Figure 3:
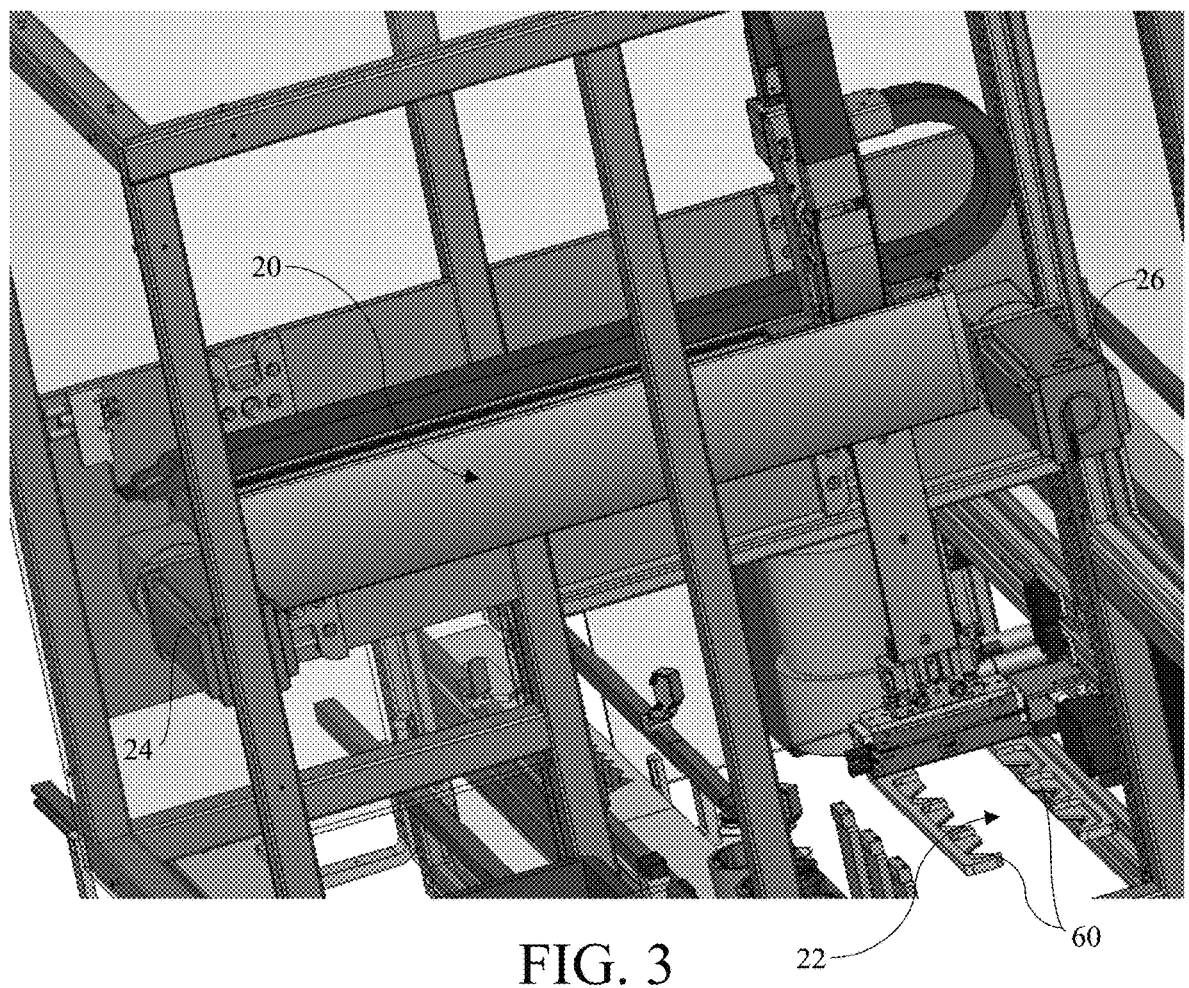
FIG. 3 is a partial perspective view of the system of FIG. 1, showing detail of a gantry.

Referring to FIGS. 1-3, the system 10 can comprise a gantry 20 comprising an end-of-arm tool 22 (EOAT). The gantry 20 can comprise a first linear actuator 24 that is configured to axially move the EOAT 22 along a first axis 4 (e.g., a vertical axis) and second linear actuator 26 that is configured axially move the EOAT along a second axis 6 (e.g., a horizontal axis) that is perpendicular to the first axis. In some aspects, the gantry 20 can have a travel distance along the second axis of at least 60 inches, at least 65 inches, at least 70 inches, at least 75 inches, or at least 80 inches. In further aspects, it is contemplated that the travel distance of the gantry along the second axis can range from 60 inches to 100 inches.

The system 10 can further comprise one or more input conveyors 30. Each input conveyor 30 of the at least one input conveyor can comprise a plurality of pucks 32 that are each configured to receive a prescription container 50 and carry the prescription container to the gantry 20. In exemplary aspects, the input conveyor(s) 30 can be, for example, X65 or X85 conveyor systems provided by FLEXLINK (Gothenburg, Sweden). In some aspects, the conveyor(s) 30 can comprise a moving platform (e.g., chain linkages), and the pucks 32 can rest on the moving platform so that friction holds the pucks in place as the moving platform moves. In other aspects, the pucks 32 can be physically coupled to the moving platform so that the pucks cannot slide relative to the moving platform.

The system 10 can further comprise one or more output conveyors 40 that are configured to receive the prescription container 50 from the gantry 20. The gantry 20 can be configured to move the prescription container from the plurality of pucks to the at least one output conveyor.

Figure 6:
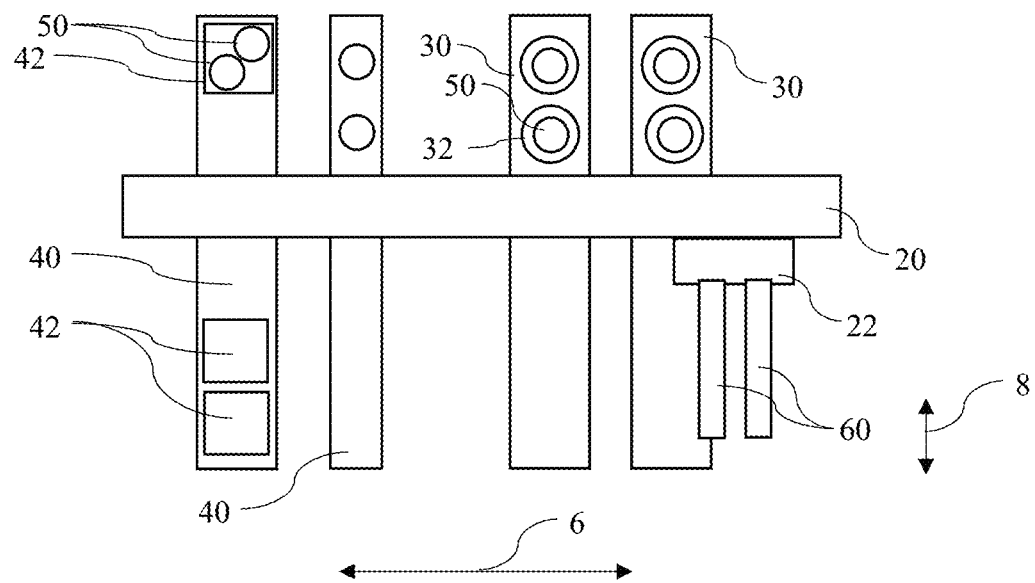
FIG. 6 is an overhead schematic diagram of an exemplary system as disclosed herein.

Referring also to FIG. 6, in some aspects, the system 10 can comprise a plurality of input conveyors 30. The plurality of input conveyors 30 can extend to the gantry along a third axis 8 (e.g., a second horizontal axis) that is perpendicular to the first axis 4 and the second axis 6. In some optional aspects, the plurality of input conveyors 30 can be spaced from each other along the second axis 6 at the gantry.

In some optional aspects, the system 10 can comprise a plurality of output conveyors 40 can extend to the gantry 20 along the third axis 8. For example, in some aspects, the plurality of output conveyors 40 can comprise two output conveyors, three output conveyors, four output conveyors or more. In some optional aspects, the plurality of input conveyors 30 can be spaced from each other along the second axis 6 at the gantry. For example, in some aspects, the plurality of input conveyors 30 can comprise two input conveyors, three input conveyors, four input conveyors or more.

Figure 4:
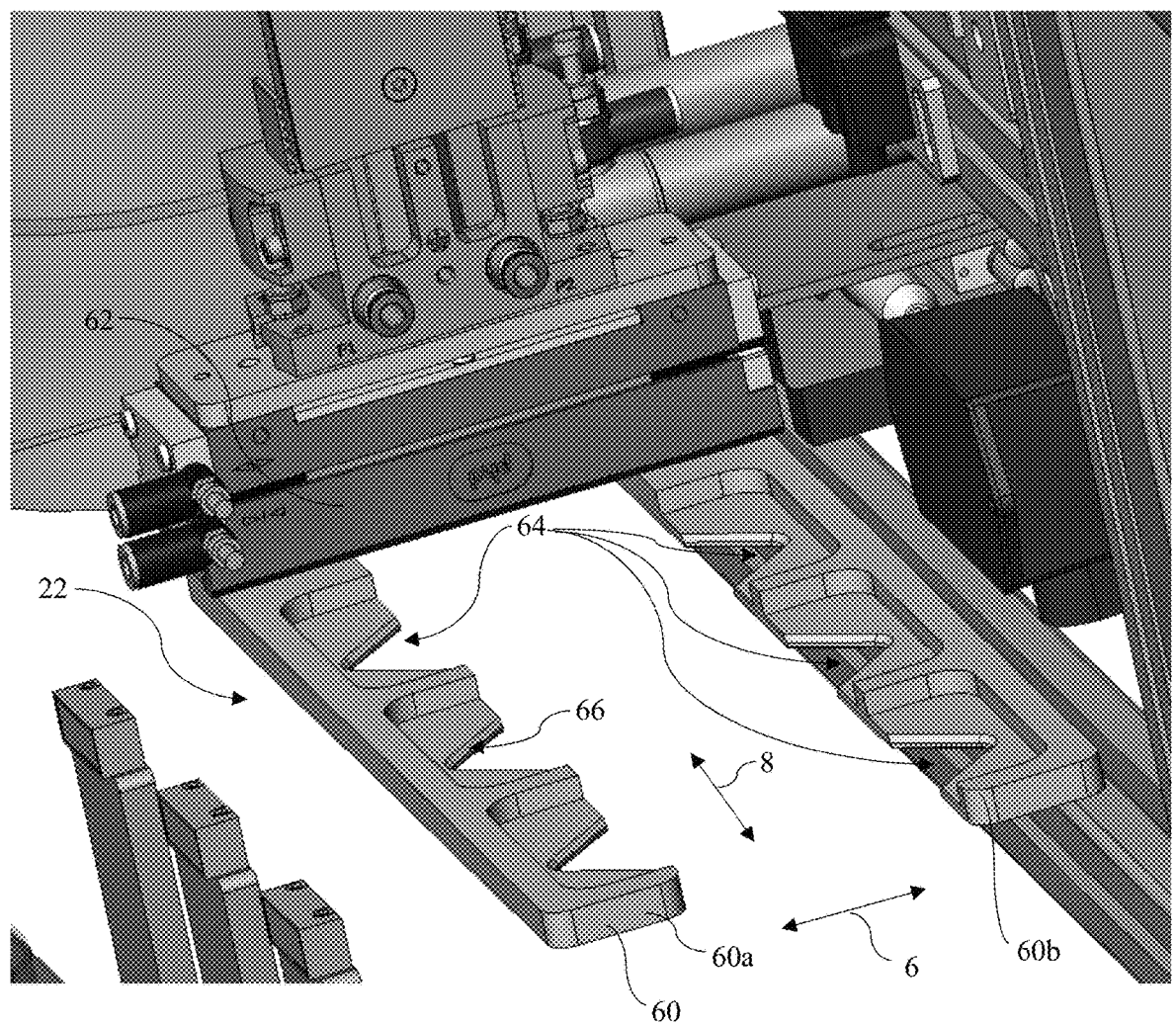
FIG. 4 is a partial perspective view of the system of FIG. 1, showing detail of the EOAT.

Referring to FIG. 4, in some aspects, the EOAT 22 can comprise opposed gripping element 60 that are movable relative to each other. For example, the opposed gripping elements 60 can be movable to each other along the second axis 4. In some optional aspects, the gripping elements 60 can be movable by a single linear actuator 62 or by respective linear actuators 62.

Figure 9:
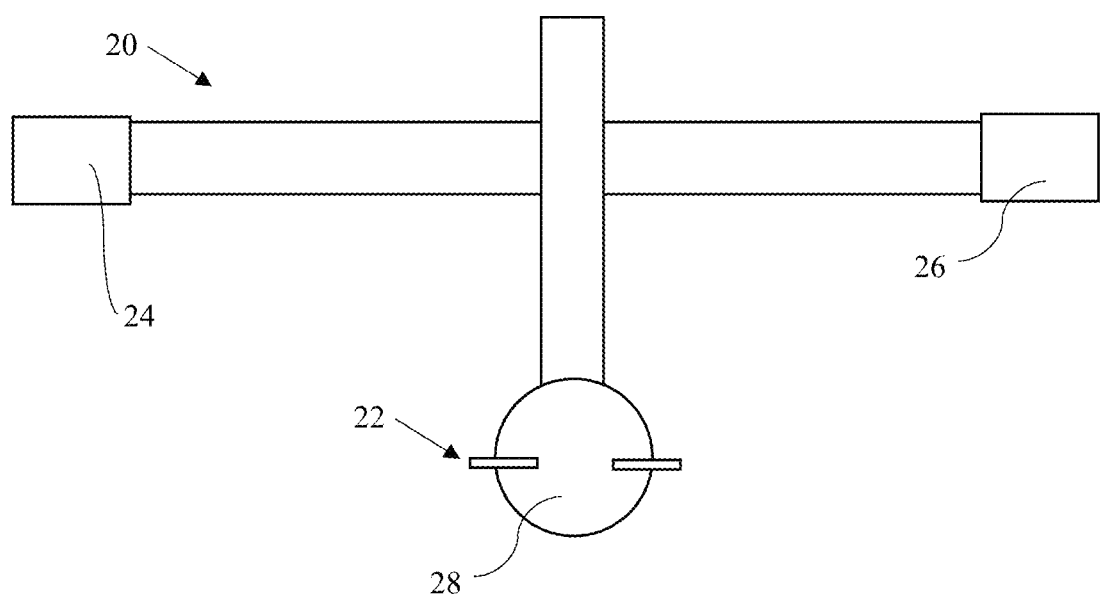
FIG. 9 is a schematic drawing of an exemplary gantry having an actuator for rotating the end of arm tool.

Optionally, referring to FIG. 9, the gantry 20 can comprise an actuator 28 that is configured to rotate the EOAT 22. For example, the gantry 20 can be configured to invert (e.g., flip over) the prescription containers 50. In this way, for example, the gantry 20 can receive vials in the pucks with the lids 54 on top, remove the vials from the pucks, invert the vials, and place the vials on the caps.

In some aspects, the opposed gripping elements 60 can comprise opposed first and second gripping elements 60*a,b*. Each of the opposed gripping elements 60 can comprise at least one cutout 64. The cutouts 64 can comprise gripping surfaces 66 defined by innermost opposed edges of the gripping elements 60. Each cutout 64 can have a width along the third axis 8. The width of each cutout 64 of the first gripping element 60*a* of the opposed gripping elements 60 can decrease along the second axis 6 in a direction away from the second gripping element 60*b* of the opposed gripping elements. That is, opposed cutouts 64 can taper in directions away from each other. In this way, the opposed gripping elements can be adapted for gripping different prescription container sizes. The closer the opposed gripping elements 60 are to each other, the smaller an area inscribed by the gripping surfaces 66 of the gripping elements 60.

Figure 5:
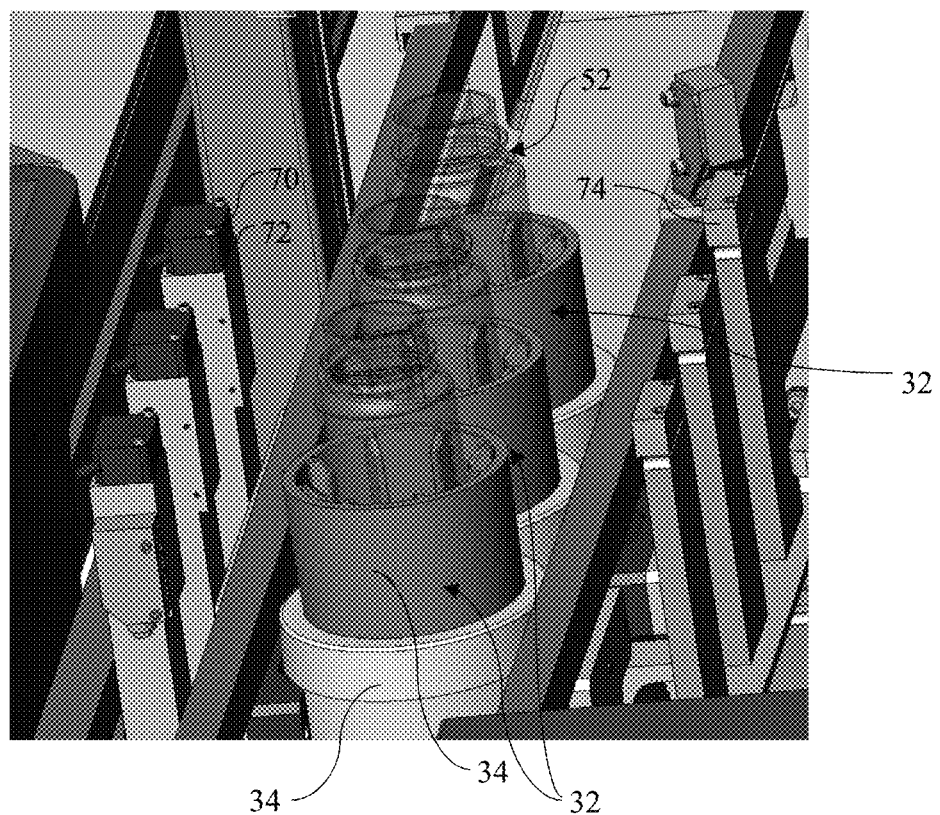
FIG. 5 is a partial perspective view of the system of FIG. 1, showing detail of prescription containers and sensors.

Referring also to FIG. 5, the gripping elements 60 can be configured to grab a neck 52 (e.g., a relatively narrow portion) of the prescription container 50 so that the neck is received between the gripping elements 60 and within opposed cutouts 64. Optionally, the gripping surfaces 66 can bias against the prescription container 50 to grip the prescription container. In further or alternative aspects, the gripping elements 60 can surround the neck so that portions of the prescription container above the neck are too wide to fit between the gripping elements. Accordingly, upward movement of the gripping elements 60 can engage the wider portions of the prescription container, thereby lifting the prescription container. Similarly, the gripping elements 60 can be configured to engage a cap 54 of a vial (FIG. 8B). For example, as illustrated in FIG. 8B, the cap 54 of a vial can have a larger dimension (e.g., diameter) than the vial. Accordingly, the gripping elements 60 can close below the cap 54 so that the cap cannot fit between the gripping elements, and upward movement of the gripping elements 60 can engage the cap, thereby lifting the vial.

In some aspects, the gripping surfaces 66 can have a wedge shape 68 with a decreasing thickness toward the opposed gripping element.

In some aspects, the gripping elements 60 can have recesses defined by a reduced thickness of the gripping elements along the first axis 4 surrounding the cutouts 64.

Optionally, each gripping element 60 can comprise a plurality of cutouts 64. For example, each gripping element can comprise 2, 3, 4, 5, or more cutouts 64. The plurality of cutouts 64 can be spaced along the third axis 8. In this way, the EOAT 22 can be configured to simultaneously grip a corresponding number of prescription containers 50.

Referring to FIG. 5, optionally, each puck 32 of the plurality of pucks 32 can comprise a receptacle 34 and an insert 36 that is received within the receptacle. The insert 36 can be configured to complementarily receive at least a portion of the prescription container 50. For example, the inserts 36 can have various diameters, various cross-sectional shapes, various depths, etc. that can match the outer circumferential surfaces of different prescription containers (with clearance to permit receipt of the containers into the respective inserts 36). In this way, the pucks 32 can be adapted to receive particular prescription containers.

In some aspects, each puck 32 can comprise an identifier. The identifier can be, for example a radio frequency identification (RFID), an optical identifier (e.g., a barcode or QR code), or an alphanumeric code. One or more identifier readers (e.g., RFID readers or optical readers) can be positioned along the input conveyor(s) 30 (e.g., near or at the gantry 20) in order to track prescriptions.

Referring to FIGS. 1 and 6, in some aspects, the system 10 can comprise one or more output conveyors 40 that are configured to carry totes 42 to and from the gantry 20. The output conveyors 40 that are configured to carry totes can be, for example, chain conveyors. In addition, or alternatively, the system 10 can comprise at least one output conveyor 40 that is configured to carry prescription containers 50 directly (e.g., not in totes). For example, the output conveyor 40 can comprise a chain conveyor upon which the prescription containers 50 can be directly placed. In alternative aspects, the output conveyor 40 can comprise a rail and a plurality of carriers that are movable along the rail, wherein the plurality of carriers are configured to receive one or more prescription containers therein.

Referring to FIGS. 1 and 5, the system 10 can comprise at least one optical sensor 70 that is configured to detect a presence of a respective prescription container 50 in a respective puck 32 of the plurality of pucks of the at least one input conveyor 30 at the gantry 10. For example, the optical sensor(s) can comprise a light emitting device and sensor 72 and a reflector 74 that is spaced from the light emitting device and sensor along the second axis 6 on an opposed side of one input conveyor 30. Thus, presence of a prescription container 50 can block the reflector 74, causing the light emitting device and sensor 72 not to receive reflected light.

A computing device 1001 (also shown in FIG. 7) can be in communication with the conveyor. The computing device 1001 can be configured as described further herein. The computing device 1001 can comprise at least one processor (e.g., processor 1003) and a memory (e.g., mass storage device 1004) in communication with the at least one processor. The memory can comprise instructions that, when executed by the at least one processor, cause the at least one processor to: a) receive, by the at least one processor, a signal from the at least one optical sensor 70 that is indicative of a presence of at least one prescription container 50 being positioned at the gantry 20 on the at least one input conveyor; and b) move, by the gantry, the at least one prescription container from the at least one input conveyor to the at least one output conveyor.

Optionally, the computing device 1001 can be embodied partly or entirely as a computer of an operator station as illustrated herein. In further aspects, the computing device 100 can be a computing device in communication with (and, optionally, controlling) various other systems associated with the system 10, including, for example, a server that controls prescription distribution throughout a pharmacy.

More generally, the computing device 1001 can track and control movement of prescription containers 50. For example, the computing device 1001 can cause the gantry 20 to place certain prescriptions in particular totes 42 or carriers 48 of particular output conveyors 40. In this way, the computing device 1001 can cause the gantry to sort prescriptions.

Method of Use of System

A method can comprise receiving, at a gantry 20, at least one prescription container 50 from at least one input conveyor 30. The gantry 20 can move the prescription container(s) 50 from the at least one input conveyor 30 to an output conveyor 40. The gantry 20 can comprise a first linear actuator 24 that is configured to axially move the EOAT along a first axis 4 and second linear actuator 26 that is configured axially move the EOAT along a second axis 6 that is perpendicular to the first axis. In exemplary aspects, the first and/or second linear actuators 24, 26 can comprise a motor gearbox and belt drive, which can be highly reliable. The belt drive can further be quiet, low maintenance, and can require lower energy than conventional robotic arms.

Each input conveyor 30 can comprise a plurality of pucks 32 that are each configured to receive a prescription container 50. Each puck 32 of the plurality of pucks can be configured to carry the prescription container 50 to the gantry 20. In some aspects, the gantry 20 can simultaneously move a plurality of prescription containers 50 by the gantry 20 from the at least one input conveyor 30 to the output conveyor 40.

Advantages of the Disclosed Systems and Methods

The gantry 20 can contrast to conventional robotic arms having a plurality of rotational axes. Robotic arms have a limited length. In order to increase the range of a robotic arm, a longer arm is required. The larger the robotic arm, the more expensive and the less precise the movements due to standard mechanics principles. For example, for a particular arm segment, an error in angle measurement causes an error in position measurement that is directly proportional to the length of the arm segment. Accordingly, longer arm segments require higher angular precision, thereby requiring more expensive components. Similarly, longer arm segments require correspondingly larger torque in order to move the arm at each joint. Thus, larger arms require larger motors and/or gearing that reduces movement speed of the arm, thereby increasing cost or reducing performance. Thus, in view of these cost, performance, and precision limitations, robotic arms are not suitable for use with scaled-up systems having more than one input or output conveyor. For example, if multiple input and/or output conveyors were used with a conventional robotic arm, the increased size of the robotic arm that would be required to access the increased number of conveyors would lead to unsuitable decreases in precision and unsuitable increases in the cost of operating the robot. Thus, the dimensions across which conventional robotic arms are configured to move can have a significant impact on the expense or performance of the robotic arm.

In contrast, the dimensions across which the disclosed gantry 20 is configured to move do not significantly affect the cost or performance of the gantry. Increasing its length does not appreciably increase its cost nor decrease its accuracy. Thus, the gantry 20 can have a travel distance along the second axis 6 that permits room for addition of one or more additional input conveyors or one or more additional output conveyors. Further, the system 10 can easily be adapted by modifying the gantry to permit an increased travel distance along the second axis 6 for adding one or more additional input conveyors or one or more additional output conveyors. That is, the gantry 20 can be extended to have longer linear travel along the second axis 6 without significantly affecting the cost or performance of the gantry.

The disclosed gantry 20 can be faster than (e.g., at least 3 times or 4 times as fast as) a conventional multi-axis robotic arm. For example, the gantry can pick up, move, and place prescription containers faster than (e.g., at least 3 times or 4 times as fast as) a conventional multi-axis robotic arm. As an additional advantage, the gantry 20 can be more reliable than conventional multi-axis robotic arms. Further, the gantry can have a longer life than a conventional multi-axis robotic arm. That is, conventional multi-axis robotic arms require more frequent servicing or replacement than the disclosed gantry. Still further, by using a gantry instead of a conventional multi-axis robotic arm, the system 10 can have reduced complexity, leading to fewer mechanical failures, reduced servicing expenses, and fewer errors during operation.

The gantry 20 disclosed herein can be standardized (e.g., across product lines). That is, a custom robotic arm does not need to be configured for use with each system. Rather, the same (or similar) equipment and logic of the gantry can be adapted for use in different systems.

Still further, the gantry disclosed herein can be adapted for use in environments previously using conventional depucking systems without affecting integrated systems upstream (e.g., picking prescription containers and placing the prescription containers in pucks) or downstream (e.g. preparing prescription containers for shipment).

Moreover, complexity of prescription sorting can be performed at the system 10, thereby centralizing complexity in a single location.

Computing Device

Figure 7:
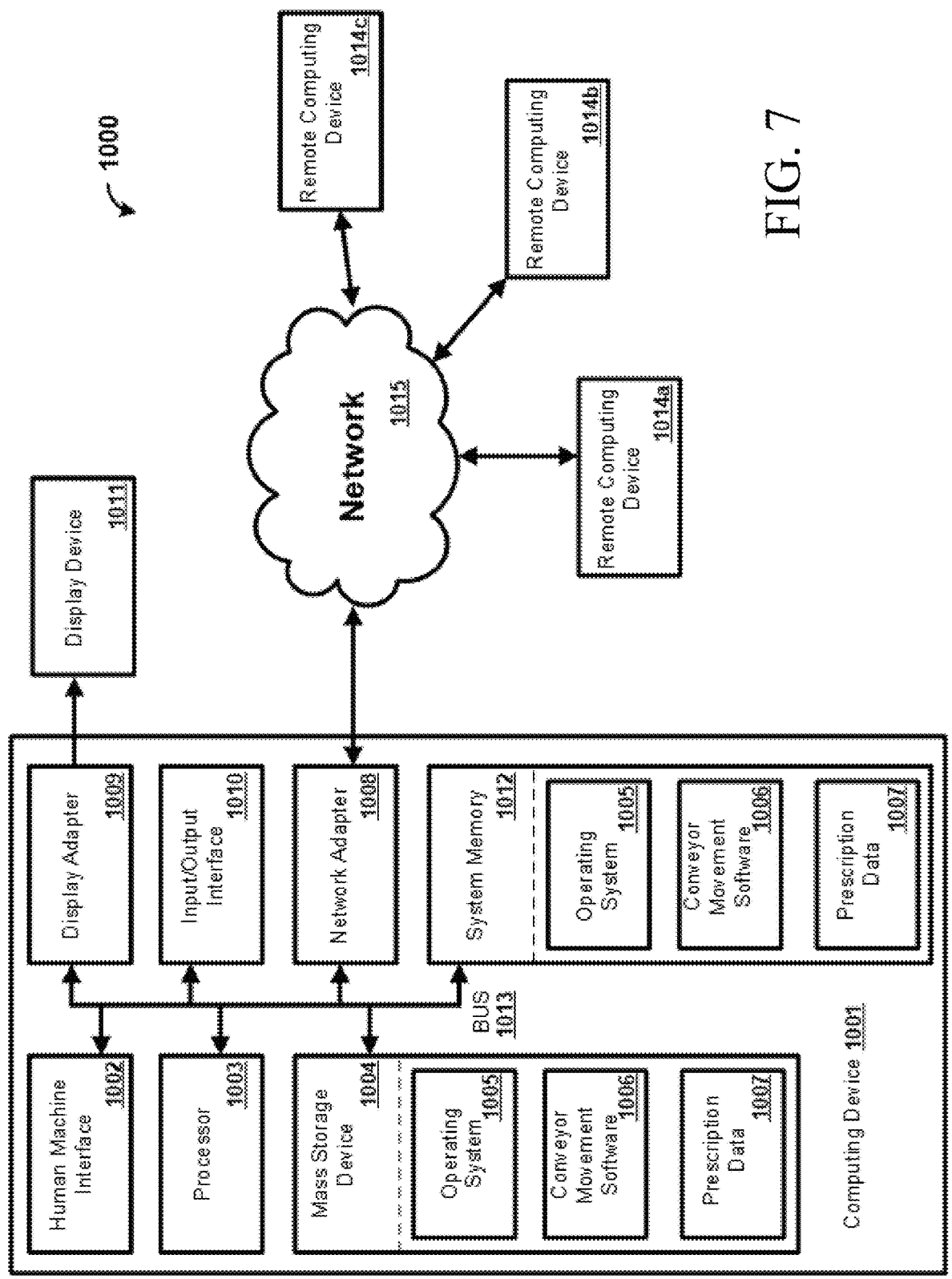
FIG. 7 is a block diagram of a computing device for use with the system as disclosed herein.

FIG. 7 shows an operating environment 1000 including an exemplary configuration of a computing device 1001 for use with the system 10 (FIG. 1).

The computing device 1001 may comprise one or more processors 1003, a system memory 1012, and a bus 1013 that couples various components of the computing device 1001 including the one or more processors 1003 to the system memory 1012. In the case of multiple processors 1003, the computing device 1001 may utilize parallel computing.

The bus 1013 may comprise one or more of several possible types of bus structures, such as a memory bus, memory controller, a peripheral bus, an accelerated graphics port, and a processor or local bus using any of a variety of bus architectures.

The computing device 1001 may operate on and/or comprise a variety of computer readable media (e.g., non-transitory). Computer readable media may be any available media that is accessible by the computing device 1001 and comprises, non-transitory, volatile and/or non-volatile media, removable and non-removable media. The system memory 1012 has computer readable media in the form of volatile memory, such as random access memory (RAM), and/or non-volatile memory, such as read only memory (ROM). The system memory 1012 may store data such as prescription data 1007 (i.e., data from signals received by the electrodes) and/or program modules such as operating system 1005 and conveyor movement software 1006 that are accessible to and/or are operated on by the one or more processors 1003.

The computing device 1001 may also comprise other removable/non-removable, volatile/non-volatile computer storage media. The mass storage device 1004 may provide non-volatile storage of computer code, computer readable instructions, data structures, program modules, and other data for the computing device 1001. The mass storage device 1004 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 1004. An operating system 1005 and conveyor movement software 1006 may be stored on the mass storage device 1004. One or more of the operating system 1005 and conveyor movement software 1006 (or some combination thereof) may comprise program modules and the conveyor movement software 1006. The prescription data 1007 may also be stored on the mass storage device 1004. The prescription data 1007 may be stored in any of one or more databases known in the art. The databases may be centralized or distributed across multiple locations within the network 1015.

A user may enter commands and information into the computing device 1001 using an input device. Such input devices comprise, but are not limited to, a joystick, a touchscreen display, a keyboard, a pointing device (e.g., a computer mouse, remote control), a microphone, a scanner, tactile input devices such as gloves, and other body coverings, motion sensor, speech recognition, and the like. These and other input devices may be connected to the one or more processors 1003 using a human machine interface 1002 that is coupled to the bus 1013 but may be connected by other interface and bus structures, such as a parallel port, game port, an IEEE 1394 Port (also known as a Firewire port), a serial port, network adapter 1008, and/or a universal serial bus (USB).

A display device 1011 may also be connected to the bus 1013 using an interface, such as a display adapter 1009. It is contemplated that the computing device 1001 may have more than one display adapter 1009 and the computing device 1001 may have more than one display device 1011. A display device 1011 may be a monitor, an LCD (Liquid Crystal Display), light emitting diode (LED) display, television, smart lens, smart glass, and/or a projector. In addition to the display device 1011, other output peripheral devices may comprise components such as speakers (not shown) and a printer (not shown) which may be connected to the computing device 1001 using Input/Output Interface 1010. Any step and/or result of the methods may be output (or caused to be output) in any form to an output device. Such output may be any form of visual representation, including, but not limited to, textual, graphical, animation, audio, tactile, and the like. The display 1011 and computing device 1001 may be part of one device, or separate devices.

The computing device 1001 may operate in a networked environment using logical connections to one or more remote computing devices 1014*a,b,c*. A remote computing device 1014*a,b,c* may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. Logical connections between the computing device 1001 and a remote computing device 1014*a,b,c* may be made using a network 1015, such as a local area network (LAN) and/or a general wide area network (WAN), or a Cloud-based network. Such network connections may be through a network adapter 1008. A network adapter 1008 may be implemented in both wired and wireless environments. Such networking environments are conventional and commonplace in dwellings, offices, enterprise-wide computer networks, intranets, and the Internet. It is contemplated that the remote computing devices 1014*a,b,c* can optionally have some or all of the components disclosed as being part of computing device 1001. In various further aspects, it is contemplated that some or all aspects of data processing described herein can be performed via cloud computing on one or more servers or other remote computing devices. Accordingly, at least a portion of the system 1000 can be configured with internet connectivity.

Exemplary Aspects

In view of the described products, systems, and methods and variations thereof, herein below are described certain more particularly described aspects of the invention. These particularly recited aspects should not however be interpreted to have any limiting effect on any different claims containing different or more general teachings described herein, or that the "particular" aspects are somehow limited in some way other than the inherent meanings of the language literally used therein.

Aspect 1: A system comprising:
  a gantry comprising an end-of-arm tool (EOAT), wherein the gantry comprises a first linear actuator that is configured to axially move the EOAT along a first axis and second linear actuator that is configured axially move the EOAT along a second axis that is perpendicular to the first axis;
  at least one input conveyor, wherein each input conveyor of the at least one input conveyor comprises a plurality of pucks that are each configured to receive a prescription container and carry the prescription container to the gantry; and
  at least one output conveyor that is configured to receive the prescription container from the gantry,
  wherein the gantry is configured to move the prescription container from the plurality of pucks to the at least one output conveyor.

Aspect 2: The system of aspect 1, wherein the at least one input conveyor comprises a plurality of input conveyors, wherein the plurality of input conveyors extend to the gantry along a third axis that is perpendicular to the first and second axes.

Aspect 3: The system of aspect 1 or aspect 2, wherein the at least one output conveyor comprises a plurality of output conveyors, wherein the plurality of output conveyors extend outwardly from the gantry along a third axis that is perpendicular to the first and second axes.

Aspect 4: The system of any one of the preceding aspects, wherein the EOAT comprises opposed gripping elements that are movable relative to each other.

Aspect 5: The system aspect 4, opposed gripping elements of the EOAT are movable relative to each other along the second axis.

Aspect 6: The system of any of aspects 4-5, wherein the opposed gripping elements comprise opposed first and second gripping elements, wherein each of the opposed gripping elements comprises at least one cutout, wherein each cutout of the at least one cutout has a width along a third axis that is perpendicular to the first and second axes, wherein the width of each cutout of the at least one cutout of the first gripping element of the opposed gripping elements decreases along the second axis in a corresponding direction away from the second gripping element of the opposed gripping elements.

Aspect 7: The system of any one of aspects 4-6, wherein the at least one cutout of each of the opposed gripping elements comprises a gripping surface having a wedge shape with a decreasing thickness toward the opposed gripping element.

Aspect 8: The system of any one of aspects 4-7, wherein the at least one cutout of each gripping element of the opposed gripping elements comprises a plurality of cutouts.

Aspect 9: The system of any one of the preceding aspects, wherein each puck of the plurality of pucks comprises a receptacle and an insert that is received within the receptacle, and wherein the insert is configured to complementarily receive at least a portion of the prescription container.

Aspect 10: The system of any one of the preceding aspects, wherein each puck of the plurality of pucks comprises an identifier.

Aspect 11: The system of any one of the preceding aspects, wherein the at least one output conveyor comprises at least one output conveyor that is configured to carry totes to and from the gantry.

Aspect 12: The system of any one of the preceding aspects, wherein the at least one output conveyor comprises at least one output conveyor having a rail and a plurality of carriers that are movable along the rail, wherein the plurality of carriers are configured to receive prescription containers therein.

Aspect 13: The system of any one of the preceding aspects, further comprising at least one optical sensor that is configured to detect a presence of a respective prescription containers in a respective puck of the plurality of pucks of the at least one input conveyor at the gantry.

Aspect 14: The system of aspect 13, further comprising a computing device having at least one processor and a memory in communication with the at least one processor, wherein the memory comprises instructions that, when executed by the at least one processor, cause the system to:
receive, by the at least one processor, a signal from the at least one optical sensor that is indicative of a presence of at least one prescription container being positioned at the gantry on the at least one input conveyor; and
move, by the gantry, the at least one prescription container from the at least one input conveyor to the at least one output conveyor.

Aspect 15: The system of any one of the preceding aspects, wherein the gantry has a travel distance along the second axis of at least 60 inches.

Aspect 16: The system of any one of the preceding aspects, wherein the prescription container is a vial or a bottle.

Aspect 17: The system of any one of the preceding aspects, wherein the first axis is a vertical axis, and wherein the second axis is a horizontal axis.

Aspect 18: A method comprising:
receiving, at a gantry, at least one prescription container from at least one input conveyor; and
moving, by the gantry, the at least one prescription container from the at least one input conveyor to an output conveyor,
wherein the gantry comprises a first linear actuator that is configured to axially move the EOAT along a first axis and second linear actuator that is configured axially move the EOAT along a second axis that is perpendicular to the first axis;
wherein each input conveyor of the at least one input conveyor comprises a plurality of pucks that are each configured to receive a prescription container, wherein each puck of the plurality of pucks is configured to carry the prescription container to the gantry.

Aspect 19: The method of aspect 18, wherein the moving, by the gantry, the at least one prescription container from the at least one input conveyor to the output conveyor comprises simultaneously moving a plurality of prescription containers by the gantry from the at least one input conveyor to the output conveyor.

Aspect 20: The system of aspect 18 or aspect 19, wherein the first axis is a vertical axis, and wherein the second axis is a horizontal axis.

Those skilled in the art will recognize or be able to ascertain using no more than routine experimentation many equivalents to the specific embodiments of the method and compositions described herein. Such equivalents are intended to be encompassed by the following claims.

What is claimed is:

1. A system comprising:
a gantry comprising an end-of-arm tool (EOAT), wherein the gantry comprises a first linear actuator that is configured to axially move the EOAT along a first axis and second linear actuator that is configured axially move the EOAT along a second axis that is perpendicular to the first axis;
at least one input conveyor, wherein each input conveyor of the at least one input conveyor comprises a plurality of pucks that are each configured to receive a prescription container and carry the prescription container to the gantry; and
at least one output conveyor that is configured to receive the prescription container from the gantry,
wherein the gantry is configured to move the prescription container from the plurality of pucks to the at least one output conveyor.

2. The system of claim 1, wherein the at least one input conveyor comprises a plurality of input conveyors, wherein the plurality of input conveyors extend to the gantry along a third axis that is perpendicular to the first and second axes.

3. The system of claim 1, wherein the at least one output conveyor comprises a plurality of output conveyors, wherein the plurality of output conveyors extend outwardly from the gantry along a third axis that is perpendicular to the first and second axes.

4. The system of claim 1, wherein the EOAT comprises opposed gripping elements that are movable relative to each other.

5. The system of claim 4, wherein the opposed gripping elements of the EOAT are movable relative to each other along the second axis.

6. The system of claim 4, wherein the opposed gripping elements comprise opposed first and second gripping elements, wherein each of the opposed gripping elements comprises at least one cutout, wherein each cutout of the at least one cutout has a width along a third axis that is perpendicular to the first and second axes, wherein the width of each cutout of the at least one cutout of the first gripping element of the opposed gripping elements decreases along the second axis in a corresponding direction away from the second gripping element of the opposed gripping elements.

7. The system of claim 4, wherein the at least one cutout of each of the opposed gripping elements comprises a gripping surface having a wedge shape with a decreasing thickness toward the opposed gripping element.

8. The system of claim 4, wherein the at least one cutout of each gripping element of the opposed gripping elements comprises a plurality of cutouts.

9. The system of claim 1, wherein each puck of the plurality of pucks comprises a receptacle and an insert that is received within the receptacle, and wherein the insert is configured to complementarily receive at least a portion of the prescription container.

10. The system of claim 1, wherein each puck of the plurality of pucks comprises an identifier.

11. The system of claim 1, wherein the at least one output conveyor comprises at least one output conveyor that is configured to carry totes to and from the gantry.

12. The system of claim 1, wherein the at least one output conveyor comprises at least one output conveyor having a rail and a plurality of carriers that are movable along the rail, wherein the plurality of carriers are configured to receive prescription containers therein.

13. The system of claim 1, further comprising at least one optical sensor that is configured to detect a presence of a respective prescription containers in a respective puck of the plurality of pucks of the at least one input conveyor at the gantry.

14. The system of claim 13, further comprising a computing device having at least one processor and a memory in communication with the at least one processor, wherein the memory comprises instructions that, when executed by the at least one processor, cause the system to:
receive, by the at least one processor, a signal from the at least one optical sensor that is indicative of a presence of at least one prescription container being positioned at the gantry on the at least one input conveyor; and move, by the gantry, the at least one prescription container from the at least one input conveyor to the at least one output conveyor.

15. The system of claim 1, wherein the gantry has a travel distance along the second axis of at least 60 inches.

16. The system of claim 1, wherein the prescription container is a vial or a bottle.

17. The system of claim 1, wherein the first axis is a vertical axis, and wherein the second axis is a horizontal axis.

\* \* \* \* \*